Sept. 7, 1954

N. DION 2,688,392

FEEDING DEVICE FOR AGRICULTURAL MACHINES

Filed Dec. 24, 1952

Inventor:
Narcisse Dion
By Alter Jourmier
Attorney

Patented Sept. 7, 1954

2,688,392

UNITED STATES PATENT OFFICE 2,688,392

FEEDING DEVICE FOR AGRICULTURAL MACHINES

Narcisse Dion, Ste-Therese de Blainville, Quebec, Canada, assignor to Dion Freres Incorporated, Ste-Therese de Blainville, Quebec, Canada Application December 24, 1952, Serial No. 327,819

2 Claims. (Cl. 198—9)

The present invention pertains to a novel agricultural machine and particularly to the feeding means therein.

In an ensilage cutter mounted on a tractor and comprising a reaper, for example, the material is taken up in a chute, lifted by an endless belt to another endless belt which in turn carries the material to the cutter. These belts are commonly of equal width.

The principal object of the invention is to increase the pick-up rate of the machine for a given size of feed belt leading to the cutter. To accomplish this object, the first or lifting belt is made shorter but considerably wider than usual.

The side walls of the chute are tapered or sloped from the wider lifting belt to the narrower feed belt. To avoid packing of material against the sloping walls is another object of the invention and is realized by means of driven, rubber-tired wheels mounted along the inner sides of the sloping walls.

The invention is fully disclosed by way of example in the following description and in the accompanying drawings in which.

Reference to these views will now be made by use of like characters which are employed to designate corresponding parts throughout.

Figure 1:
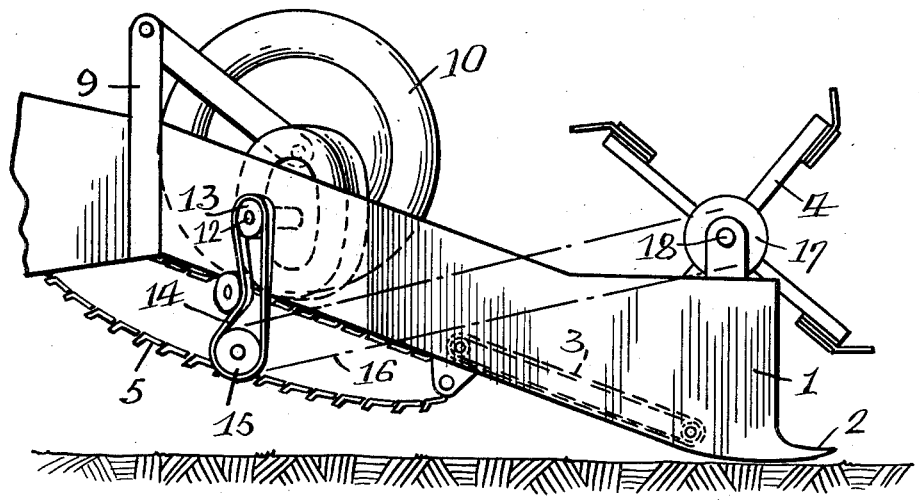
Figure 1 is a side view.
Figure 2:
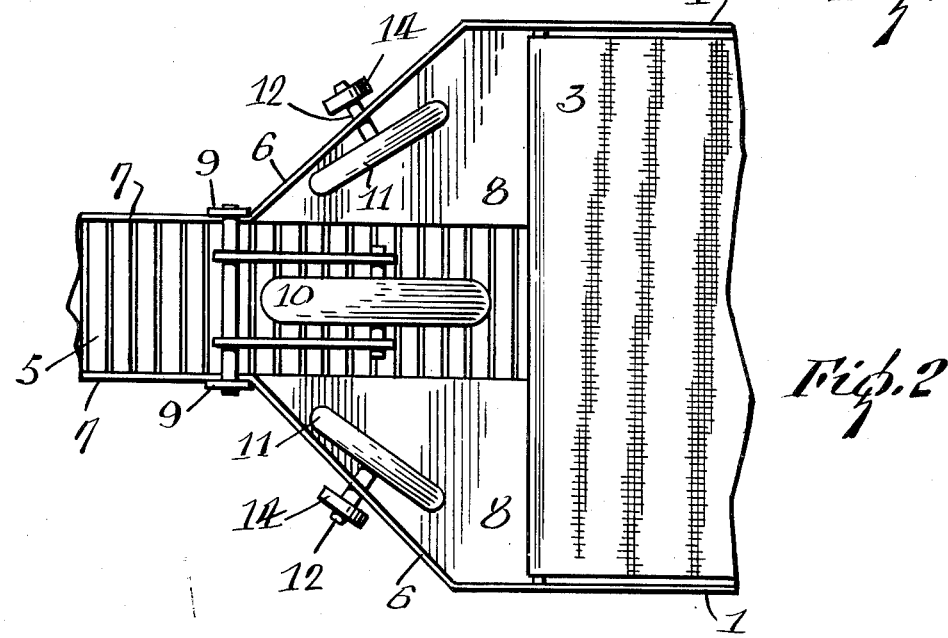
Figure 2 is a fragmentary plan view.

In Figure 1 is shown the body or chute 1 of a reaper with a scoop 2 at its forward end for the usual purpose. Adjacent to the scoop, is an endless belt 3 for carrying the material upward in the body. Over the scoop, the body carries the usual rotating paddle 4.

At the discharge end of the belt 3, an endless feed belt 5 is mounted in the body. The two belts are co-axial and the lifting belt 3 is considerably wider than the feed belt 5. The wider body portion 1 tapers by means of side walls 6 to intermediate points at the sides of the belt 5, and is then prolonged by parallel walls 7 along the remaining length of the belt 5. Additional floor or table boards 8 extend from the discharge end of the belt 3 along the sides of the belt 5 to the sloping walls 6.

The belt 5 carries the material to an ensilage cutter. The wider belt 3 is of less than usual length but has been found to deliver the ensilage faster, together with the correspondingly wider scoop 2.

An upright frame 9 is mounted at the throat between the side walls 6 and 7 and carries a rubber-tired wheel 10 disposed over the belt 5. To avoid packing of the material against the walls 6, smaller rubber-tired wheels 11 are mounted on stub shafts 12 in these walls. These wheels are substantially parallel to the walls and drive the material to the belt 5.

The wheels 11 are driven by any suitable means. For example, pulleys 13 on the shafts 12 are belted at 14 to idlers 15 which in turn, are belted at 16 to pulleys 17 on the paddle wheel shaft 18.

Although a specific embodiment of the invention has been illustrated and described, it will be understood that various alterations in the details of construction may be made without departing from the scope of the invention as indicated by the appended claims.

What I claim is:

1. In an agricultural machine, a chute-like body, a scoop at one end thereof, an endless lifting belt adjacent to said scoop, an endless feed belt alined co-axially with the lifting belt, the lifting belt being substantially wider than the feed belt, the side walls of said body sloping from said lifting belt to intermediate points along the sides of said feed belt and being continued along said sides, floor boards extending from the discharge end of said lifting belt along said feed belt to said sloping walls, and wheels mounted on said sloping walls for conveying material from said floor boards to said feed belt.

2. In an agricultural machine, a chute-like body, a scoop at one end thereof, an endless lifting belt adjacent to said scoop, an endless feed belt alined co-axially with the lifting belt, the lifting belt being substantially wider than the feed belt, the side walls of said body sloping from said lifting belt to intermediate points along the sides of said feed belt and being continued along said sides, floor boards extending from the discharge end of said lifting belt along said feed belt to said sloping walls, and wheels mounted on said sloping walls for conveying material from said floor boards to said feed belt, said wheels being substantially parallel to said sloping walls.

References Cited in the file of this patent

UNITED STATES PATENTS

| Number | Name | Date |
|---|---|---|
| 485,769 | McCreary | Nov. 8, 1892 |
| 2,490,143 | Magee | Dec. 6, 1949 |
| 2,507,540 | Nolt | May 16, 1950 |